(12) United States Patent
Jeong et al.

(10) Patent No.: US 7,864,209 B2
(45) Date of Patent: Jan. 4, 2011

(54) AUDIO PROCESSING IN A MULTI-PARTICIPANT CONFERENCE

(75) Inventors: Hyeonkuk Jeong, San Jose, CA (US); Ryan Salsbury, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1409 days.

(21) Appl. No.: 11/118,555

(22) Filed: Apr. 28, 2005

(65) Prior Publication Data

US 2006/0247045 A1  Nov. 2, 2006

(51) Int. Cl.
H04N 7/15 (2006.01)
(52) U.S. Cl. .................................. 348/14.08
(58) Field of Classification Search .............. 348/14.08, 348/14.09, 14.01; 370/352; 379/202.01, 379/203.01, 204.01, 205.01, 206.01
See application file for complete search history.

(56) References Cited

U.S. PATENT DOCUMENTS

| | | | |
|---|---|---|---|
| 4,441,151 A | | 4/1984 | Hayashibe |
| 4,558,430 A | | 12/1985 | Mogami et al. |
| 4,602,326 A | | 7/1986 | Kraus |
| 4,847,829 A | | 7/1989 | Tompkins et al. |
| 5,319,682 A | | 6/1994 | Clark |
| 5,604,738 A | * | 2/1997 | Shibata et al. ........... 348/14.08 |
| 5,826,083 A | | 10/1998 | Prasad |
| 5,838,664 A | | 11/1998 | Polomski |
| 5,896,128 A | * | 4/1999 | Boyer ..................... 348/14.09 |
| 5,933,417 A | | 8/1999 | Rottoo |
| 5,953,049 A | * | 9/1999 | Horn et al. ............... 348/14.09 |
| 5,964,842 A | | 10/1999 | Packard |
| 6,167,033 A | | 12/2000 | Chang et al. |
| 6,167,432 A | | 12/2000 | Jiang |
| 6,311,224 B1 | | 10/2001 | Packard |
| 6,487,578 B2 | | 11/2002 | Ranganathan |
| 6,496,216 B2 | | 12/2002 | Feder |
| 6,629,075 B1 | | 9/2003 | Schalkwk |
| 6,633,985 B2 | | 10/2003 | Drell |
| 6,697,341 B1 | | 2/2004 | Roy |
| 6,697,476 B1 | | 2/2004 | O'Malley |
| 6,728,221 B1 | | 4/2004 | Shaffer et al. |
| 6,744,460 B1 | | 6/2004 | Nimri |
| 6,757,005 B1 | | 6/2004 | Elbaz |

(Continued)

FOREIGN PATENT DOCUMENTS

EP  0 744 857  11/1996

(Continued)

OTHER PUBLICATIONS

Final Rejection of U.S. Appl. No. 11/118,554, Dec. 12, 2008 (mailing date), Thomas Pun, et al.

(Continued)

*Primary Examiner*—Stella L Woo
(74) *Attorney, Agent, or Firm*—Adeli & Tollen LLP

(57) ABSTRACT

Some embodiments provide an architecture for establishing multi-participant audio conferences over a computer network. This architecture has a central distributor that receives audio signals from one or more participants. The central distributor mixes the received signals and transmits them back to participants. In some embodiments, the central distributor eliminates echo by removing each participant's audio signal from the mixed signal that the central distributor sends to the particular participant.

53 Claims, 9 Drawing Sheets

U.S. PATENT DOCUMENTS

| | | | |
|---|---|---|---|
| 6,760,749 | B1 | 7/2004 | Dunlap |
| 6,882,971 | B2* | 4/2005 | Craner .................... 704/246 |
| 6,915,331 | B2 | 7/2005 | Fuller et al. |
| 6,989,856 | B2 | 1/2006 | Firestone et al. |
| 7,096,037 | B2 | 8/2006 | Canova, Jr. et al. |
| 7,266,091 | B2 | 9/2007 | Singh et al. |
| 7,321,382 | B2 | 1/2008 | Okajima et al. |
| 7,474,326 | B2 | 1/2009 | Le Pennec |
| 7,474,634 | B1 | 1/2009 | Webster et al. |
| 2001/0019354 | A1 | 9/2001 | Einarsson et al. |
| 2002/0126626 | A1 | 9/2002 | Singh et al. |
| 2004/0028199 | A1 | 2/2004 | Carlson |
| 2004/0215722 | A1 | 10/2004 | Mukherjee |
| 2004/0233990 | A1 | 11/2004 | Sekiguchi et al. |
| 2004/0257434 | A1 | 12/2004 | Davis et al. |
| 2005/0018828 | A1* | 1/2005 | Nierhaus et al. ....... 379/202.01 |
| 2005/0097169 | A1 | 5/2005 | Mukherjee et al. |
| 2005/0099492 | A1* | 5/2005 | Orr .................... 348/14.08 |
| 2005/0286443 | A1 | 12/2005 | McMillen et al. |
| 2006/0029092 | A1 | 2/2006 | Luo et al. |
| 2006/0187860 | A1* | 8/2006 | Li ........................ 370/260 |
| 2006/0244812 | A1 | 11/2006 | Jeong et al. |
| 2006/0244816 | A1 | 11/2006 | Jeong et al. |
| 2006/0244819 | A1 | 11/2006 | Pun et al. |
| 2006/0245377 | A1 | 11/2006 | Jeong et al. |
| 2006/0245378 | A1 | 11/2006 | Jeong et al. |
| 2006/0245379 | A1 | 11/2006 | Abuan et al. |

FOREIGN PATENT DOCUMENTS

| | | |
|---|---|---|
| EP | 750236 | 12/1996 |
| EP | 1875769 | 1/2008 |
| EP | 1877148 | 1/2008 |
| EP | 1878229 | 1/2008 |
| EP | 1936996 | 6/2008 |
| GB | 1342781 | 1/1974 |
| GB | 2 313 250 | 11/1997 |
| WO | WO 99/62259 | 12/1999 |
| WO | WO 2004030369 | 4/2004 |
| WO | WO 2006116644 | 11/2006 |
| WO | WO 2006116659 | 11/2006 |
| WO | WO 2006116750 | 11/2006 |

OTHER PUBLICATIONS

International Preliminary Report on Patentability and Written Opinion of PCT/US2006/016169, Dec. 11, 2008 (mailing date), Apple Computer Inc.
Restriction Requirement of U.S. Appl. No. 11/118,553, Oct. 7, 2008 (mailing date), Jeong, Hyeonkuk, et al.
Non Final Rejection of U.S. Appl. No. 11/118,554, Feb. 21, 2008 (mailing date), Thomas Pun, et al.
International Search Report and Written Opinion of PCT/2006/016123, Sep. 26, 2008 (mailing date), Apple Computer, Inc.
International Preliminary Report on Patentability and Written Opinion for PCT/US2006/016469, Oct. 30, 2007 (mailing date), Apple Computer, Inc.
International Search Report and Written Opinion of PCT/US2006/016169, Oct. 16, 2008 (mailing date), Apple Computer Inc.
Wong et al., "PID-based Real-time Rate Control", Jun. 2004, IEEE Conference on Multimedia and Expo, vol. 1, pp. 221-224.
Zhanjun et al., "The Guarantee of QoS for Wireless Multimedia Streams Based on Adaptive Session", Dec. 2000, IEEE International, Conference on Personal Wireless Communications, pp. 283-287.
Non-Final Office Action of U.S. Appl. No. 11/118,931, Feb. 3, 2009 (mailing date), Jeong, Hyeonkuk, et al.
Non-Final Office Action of U.S. Appl. No. 11/118,932, Apr. 29, 2009 (mailing date), Abuan, Joe, et al.
Non-Final Office Action of U.S. Appl. No. 11/118,297, Jan. 27, 2009 (mailing date), Jeong, Hyeonkuk, et al.
Non-Final Office Action for U.S. Appl. No. 11/118,553, Feb. 4, 2009 (mailing date), Jeong, Hyeonkuk, et al.
Non-Final Office Action for U.S. Appl. No. 11/118,615, Mar. 31, 2009 (mailing date), Pun, Thomas, et al.
International Preliminary Report on Patentability for PCT/US2006/016123, May 7, 2009 (mailing date), Apple Computer, Inc.
International Search Report and Written Opinion of PCT/2006/016123, Sep. 26, 2008 (mailing date), Apple Computer, Inc.
International Preliminary Report on Patentability for PCT/US2006/016169, Dec. 11, 2008 (mailing date), Apple Computer, Inc.
Portions of prosecution history of U.S. Appl. No. 11/118,931, Dec. 6, 2009, Jeong, Hyeonkuk, et al., including an action dated Sep. 1, 2009; and responses/amendments dated Oct. 24, 2008, Nov. 4, 2008, Jun. 3, 2009, Nov. 14, 2009, and Dec. 6, 2009 (85 pages).
Portions of prosecution history of U.S. Appl. No. 11/118,554, Dec. 1, 2009, Jeong, Hyeonkuk, et al., including an action dated Sep. 1, 2009; and responses/amendments dated Jul. 21, 2008, Aug. 8, 2008, Nov. 4, 2008, May 12, 2009, Jun. 1, 2009, and Dec. 1, 2009 (66 pages).
Portions of prosecution history of U.S. Appl. No. 11/118,932, Nov. 24, 2009, Joe Abuan, et al., including an action dated Nov. 24, 2009; and responses/amendments dated Nov. 5, 2008, Nov. 17, 2008, and Jul. 29, 2009 (46 pages).
Portions of prosecution history of U.S. Appl. No. 11/118,297, Nov. 25, 2009, Jeong, Hyeonkuk, et al., including actions dated Aug. 17, 2009 and Nov. 4, 2009; and responses/amendments dated Nov. 10, 2008, Nov. 24, 2008, Apr. 27, 2009, Oct. 19, 2009, Nov. 14, 2009, andNov. 25, 2009 (100 pages).
Portions of prosecution history of U.S. Appl. No. 11/118,553, Dec. 9, 2009, Jeong, Hyeonkuk, et al., including an action dated Aug. 13, 2009; and responses/amendments dated May 12, 2008, Nov. 6, 2008, Nov. 10, 2008, May 4, 2009, and Dec. 9, 2009 (63 pages).
Portions of prosecution history of U.S. Appl. No. 11/118,615, Oct. 15, 2009, Thomas Pun, et al., including an action dated Oct. 15, 2009; and responses/amendments dated May 12, 2008, Nov. 10, 2008, Jun. 30, 2009 (39 pages).
Search Report of EP06751923.1, Oct. 14, 2009 (mailing date), Apple Computer, Inc.
U.S. Appl. No. 12/643,958, filed Dec. 21, 2009, Jeong, Hyeonkuk, et al.
U.S. Appl. No. 12/702,287, filed Feb. 8, 2010, Pun, Thomas, et al.
Non-Final Office Action of U.S. Appl. No. 11/118,931, Apr. 1, 2010, Jeong, Hyeonkuk, et al.
Response to Office Action of U.S. Appl. No. 11/118,932, Mar. 24, 2010, Abuan, Joe, et al.
Updated portions of prosecution history of U.S. Appl. No. 11/118,297, Feb. 25, 2010, Jeong, Hyeonkuk, et al., including actions dated Feb. 25, 2010, and Oct. 30, 2009; and responses/amendments dated Nov. 14, 2009, and Oct. 21, 2009 (15 pages).
Updated portions of prosecution history of U.S. Appl. No. 11/118,553, Apr. 26, 2010, Jeong, Hyeonkuk, et al., including actions dated Feb. 23, 2010, Jan. 25, 2010, and Oct. 27, 2009; and responses/amendments dated Apr. 26, 2010, Oct. 21, 2009 (14 pages).
Amendment after Notice of Allowance of U.S. Appl. No. 11/118,615, Jan. 12, 2010, Pun, Thomas, et al.
U.S. Appl. No. 10/877,507, Jun. 25, 2004, Bruce Arthur, et al.
International Search Report of PCT Application PCT/US2006/016469, Apple Computer, Inc., Sep. 18, 2006.
Written Opinion of the International Searching Authority of PCT Application PCT/US2006/016469, Apple Computer, Inc., Sep. 18, 2006.

* cited by examiner

_US 7,864,209 B2_

AUDIO PROCESSING IN A MULTI-PARTICIPANT CONFERENCE

CROSS REFERENCE TO RELATED APPLICATIONS

This Application is related to the following applications: U.S. patent application Ser. No. 11/118,931, filed Apr. 28, 2005; U.S. patent application Ser. No. 11/118,554, filed Apr. 28, 2005; U.S. patent application Ser. No. 11/118,932, filed Apr. 28, 2005; U.S. patent application Ser. No. 11/118,297, filed Apr. 28, 2005; U.S. patent application Ser. No. 11/118,553, filed Apr. 28, 2005; and U.S. patent application Ser. No. 11/118,615, filed Apr. 28, 2005.

FIELD OF THE INVENTION

The present invention relates to audio processing in a multi-participant conference.

BACKGROUND OF THE INVENTION

With proliferation of general-purpose computers, there has been an increase in demand for performing conferencing through personal or business computers. In such conferences, it is desirable to identify quickly the participants that are speaking at any given time. Such identification, however, becomes difficult as more participants are added, especially for participants that only receive audio data. This is because prior conferencing applications do not provide any visual or auditory cues to help identify active speakers during a conference. Therefore, there is a need in the art for conferencing applications that assist a participant in quickly identifying the active speaking participants of the conference.

SUMMARY OF THE INVENTION

Some embodiments provide an architecture for establishing multi-participant audio conferences over a computer network. This architecture has a central distributor that receives audio signals from one or more participants. The central distributor mixes the received signals and transmits them back to participants. In some embodiments, the central distributor eliminates echo by removing each participant's audio signal from the mixed signal that the central distributor sends to the particular participant.

In some embodiments, the central distributor calculates a signal strength indicator for every participant's audio signal and passes the calculated indicia along with the mixed audio signal to each participant. Some embodiments then use the signal strength indicia to display audio level meters that indicate the volume levels of the different participants. In some embodiments, the audio level meters are displayed next to each participant's picture or icon. Some embodiments use the signal strength indicia to enable audio panning.

In some embodiments, the central distributor produces a single mixed signal that includes every participant's audio. This stream (along with signal strength indicia) is sent to every participant. When playing this stream, a participant will mute playback if that same participant is the primary contributor. This scheme provides echo suppression without requiring separate, distinct streams for each participant. This scheme requires less computation from the central distributor. Also, through IP multicasting, the central distributor can reduce its bandwidth requirements.

Some embodiments provide a computer readable medium that stores a computer program for distributing audio content in a multi-participant audio/video conference. The conference has one central distributor of audio content. The program includes sets of instructions for (1) receiving, at the central distributor, audio signals from each participant, (2) generating mixed audio signals from the received audio signals, and (3) transmitting the audio signals to the participants.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide an architecture for establishing multi-participant audio/video conferences. This architecture has a central distributor that receives audio signals from one or more participants. The central distributor mixes the received signals and transmits them back to participants. In some embodiments, the central distributor eliminates echo by removing each participant's audio signal from the mixed signal that the central distributor sends to the particular participant.

In some embodiments, the central distributor calculates a signal strength indicator for every participant's audio signal and passes the calculated indicia along with the mixed audio signal to each participant. Some embodiments then use the signal strength indicia to display audio level meters that indicate the volume levels of the different participants. In some embodiments, the audio level meters are displayed next to each participant's picture or icon. Some embodiments use the signal strength indicia to enable audio panning.

Several detailed embodiments of the invention are described below. In these embodiments, the central distributor is the computer of one of the participants of the audio/video conference. One of ordinary skill will realize that other embodiments are implemented differently. For instance, the central distributor in some embodiments is not the computer of any of the participants of the conference.

I. Overview

Figure 1:
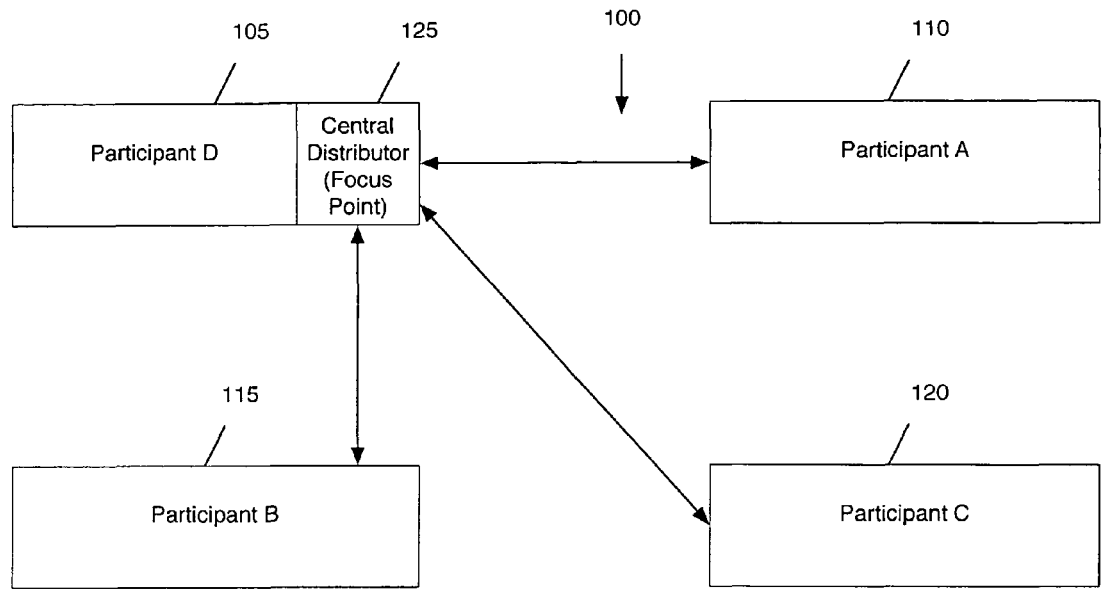
FIG. 1 illustrates an example of the audio/video conference architecture of some embodiments of the invention.

FIG. 1 illustrates an example of conference architecture 100 of some embodiments of the invention. This architecture allows multiple participants to engage in a conference through several computers that are connected by a computer network. In the example illustrated in FIG. 1, four participants A, B, C, and D are engaged in the conference through their four computers 105-120 and a network (not shown) that connects these computers. The network that connects these computers can be any network, such as a local area network, a wide area network, a network of networks (e.g., the Internet), etc.

The conference can be an audio/video conference, or an audio only conference, or an audio/video conference for some participants and an audio only conference for other participants. During the conference, the computer 105 of one of the participants (participant D in this example) serves as a central distributor of audio and/or video content (i.e., audio/video content), as shown in FIG. 1. This central distributor 125 will be referred to below as the focus point of the multi-participant conference. The computers of the other participants will be referred to below as non-focus machines or non-focus computers.

Also, the discussion below focuses on the audio operations of the focus and non-focus computers. The video operation of these computers is further described in U.S. patent application Ser. No. 11/118,553, now issued as U.S. Pat. No. 7,817,180, entitled "Video Processing in a Multi-Participant Video Conference", filed concurrently with this application. In addition, U.S. patent application Ser. No. 11/118,931, now published as U.S. Patent Application Publication No. 2006-0245378, entitled "Multi-Participant Conference Setup", filed concurrently with this application, describes how some embodiments set up a multi-participant conference through a focus-point architecture, such as the one illustrated in FIG. 1. Both these applications are incorporated herein by reference.

Figure 2:
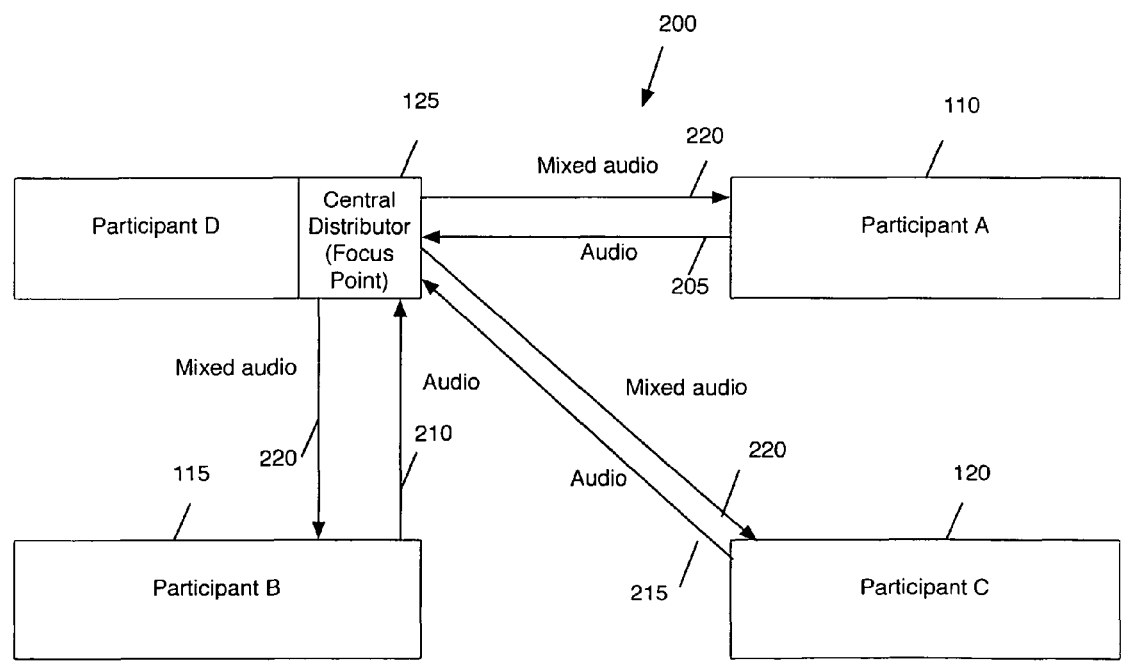
FIGS. 2 and 3 illustrate how some embodiments exchange audio content in a multi-participant audio/video conference.

As the central distributor of audio/video content, the focus point 125 receives audio signals from each participant, mixes and encodes these signals, and then transmits the mixed signal to each of the non-focus machines. FIG. 2 shows an example of such audio signal exchange for the four participant example of FIG. 1. Specifically, FIG. 2 illustrates the focus point 125 receiving compressed audio signals 205-215 from other participants. From the received audio signals 205-215, the focus point 125 generates a mixed audio signal 220 that includes each of the received audio signals and the audio signal from the participant using the focus point computer. The focus point 125 then compresses and transmits the mixed audio signal 220 to each non-focus machine 110, 115, and 120.

In the example illustrated in FIG. 2, the mixed audio signal 220 that is transmitted to each particular non-focus participant also includes the audio signal of the particular non-focus participant. In some embodiments, however, the focus point removes a particular non-focus participant's audio signal from the mixed audio signal that the focus point transmits to the particular non-focus participant. In these embodiments, the focus point 125 removes each participant's own audio signal from its corresponding mixed audio signal in order to eliminate echo when the mixed audio is played on the participant computer's loudspeakers.

Figure 3:
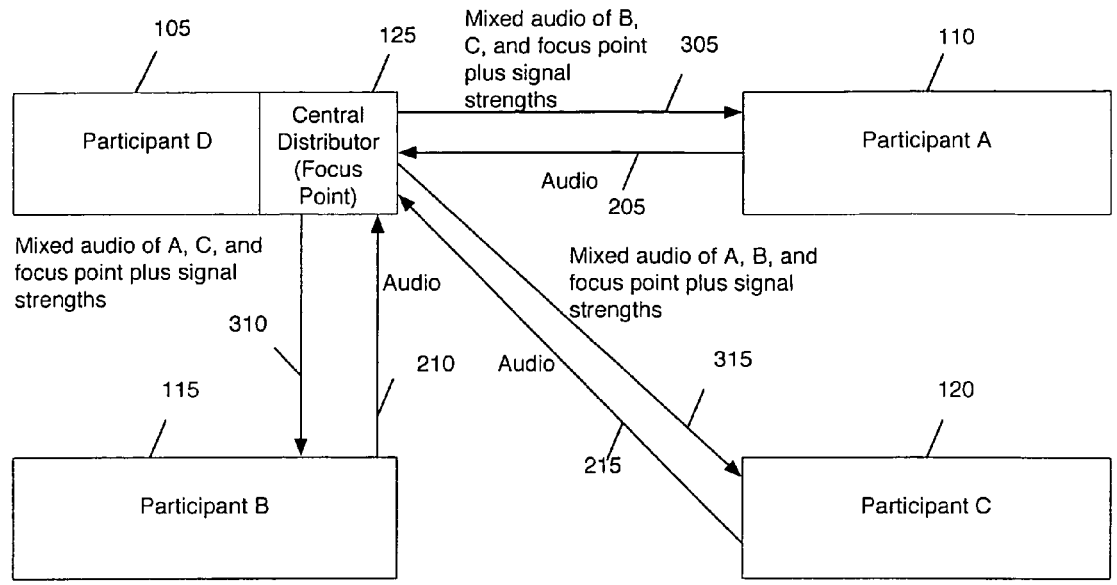

FIG. 3 illustrates an example of this removal for the example illustrated in FIG. 2. Specifically, FIG. 3 illustrates (1) for participant A, a mixed audio signal 305 that does not have participant A's own audio signal 205, (2) for participant B, a mixed audio signal 310 that does not have participant B's own audio signal 210, and (3) for participant C, a mixed audio signal 315 that does not have participant C's own audio signal 215.

As shown in FIG. 3, the focus point 125 in some embodiments calculates signal strength indicia for the participants' audio signals, and appends the signal strength indicia to the mixed signals that it sends to each participant. The non-focus computers then use the appended signal strength indicia to display audio level meters that indicate the volume levels of the different participants. In some embodiments, the audio level meters are displayed next to each participant's picture or icon.

Some embodiments also use the transmitted signal strength indicia to pan the audio across the loudspeakers of a participant's computer, in order to help identify orators during the conference. This panning creates an effect such that the audio associated with a particular participant is perceived to originate from a direction that reflects the on-screen position of that participant's image or icon. The panning effect is created by introducing small delays to the left or right channels. The positional effect relies on the brain's perception of small delays and phase differences. Audio level meters and audio panning are further described below.

Figure 4:
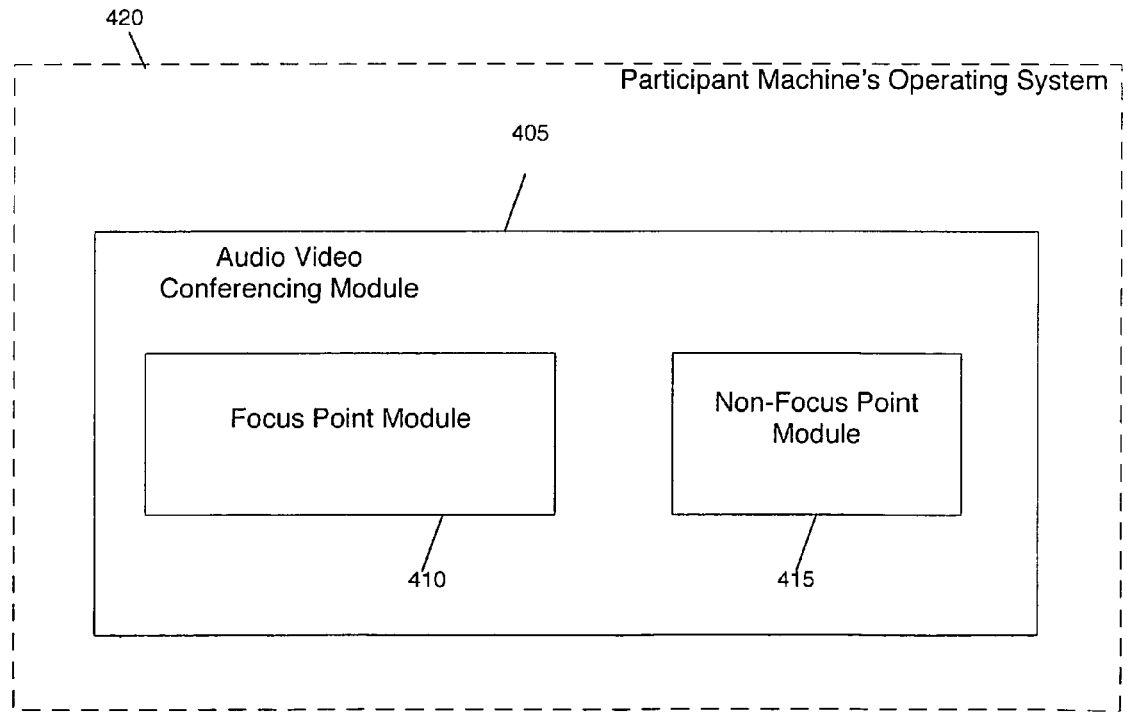
FIG. 4 shows the software components of the audio/video conferencing application of some embodiments of the invention.

Some embodiments are implemented by an audio/video conference application that can perform both focus and non-focus point operations. FIG. 4 illustrates a software architecture for one such application. Specifically, this figure illustrates an audio/video conference application 405 that has two modules, a focus point module 410 and a non-focus point module 415. Both these modules 410 and 415, and the audio/video conference application 405, run on top an operating system 420 of a conference participant's computer.

During a multi-participant conference, the audio/video conference application 405 uses the focus point module 410 when this application is serving as the focus point of the conference, or uses the non-focus point module 415 when it is not serving as the focus point. The focus point module 410 performs focus point audio-processing operations when the audio/video conference application 405 is the focus point of a multi-participant audio/video conference. On the other hand, the non-focus point module 415 performs non-focus point, audio-processing operations when the application 405 is not the focus point of the conference. In some embodiments, the focus and non-focus point modules 410 and 415 share certain resources.

The focus point module 410 is described in Section II of this document, while the non-focus point module 415 is described in Section III.

II. The Focus Point Module

Figure 5:
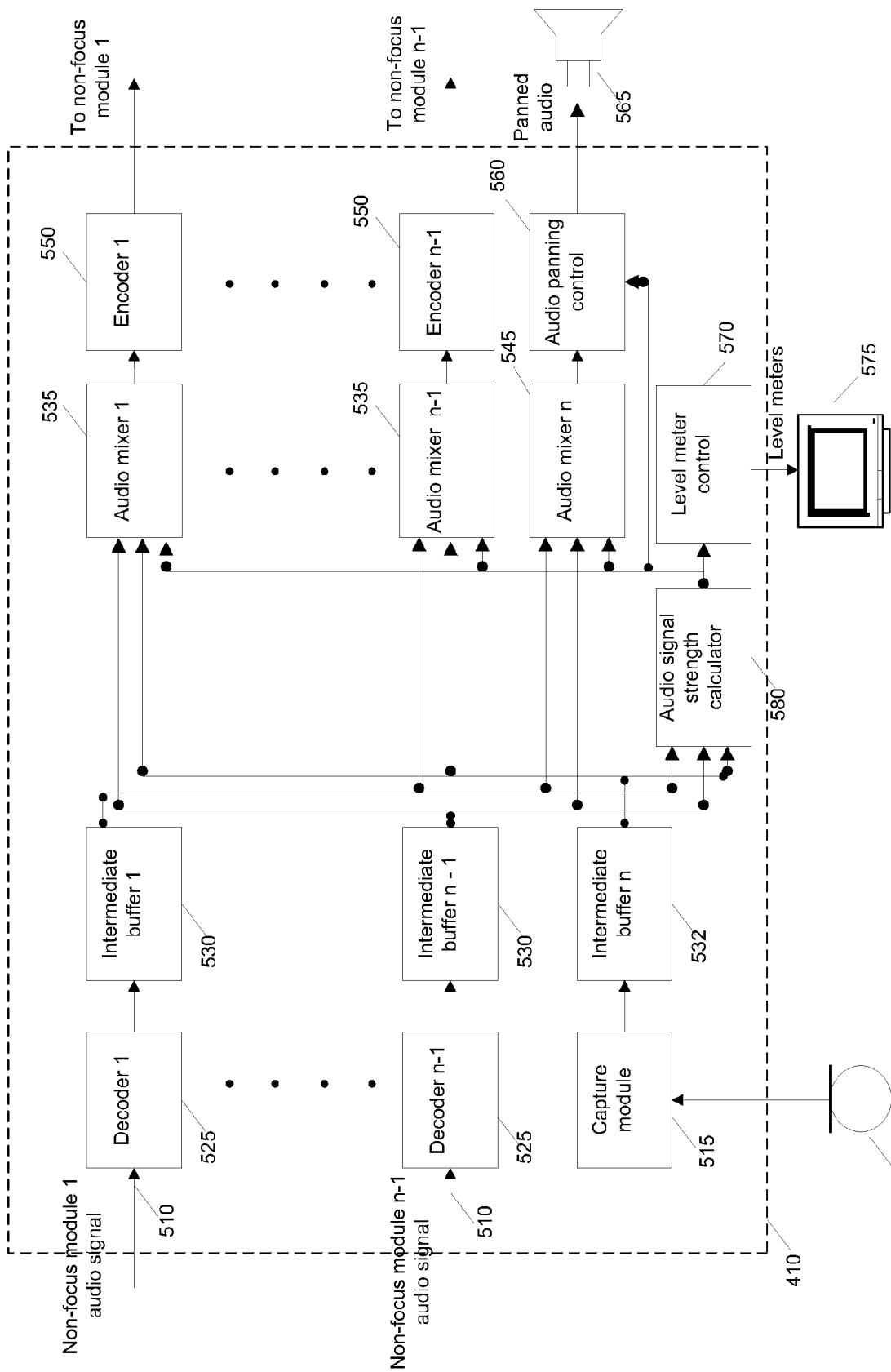
FIG. 5 illustrates the focus point module of some embodiments of the invention.

FIG. 5 illustrates the focus point module 410 of some embodiments of the invention. The focus point module 410 is shown during an audio/video conferencing with multiple participants. In order to generalize the focus point operations, the example in FIG. 5 is illustrated as having an arbitrary number of participants. This arbitrary number is denoted as "n", which represents a number greater than 2. The focus point module 410 generates mixed audio signals for transmitting to non-focus participants, and performs audio presentation for the conference participant who is using the focus point computer during the video conference. For its audio mixing operation, the focus point module 410 utilizes (1) one decoder 525 and one intermediate buffer 530 for each incoming audio signal, (2) an intermediate buffer 532 for the focus point audio signal, (3) one audio capture module 515, (3) one audio signal strength calculator 580, and (4) one audio mixer 535 for each transmitted mixed audio signal, and one encoder 550 for each transmitted mixed audio signal. For its audio presentation operation at the focus-point computer, the focus point module 410 also utilizes one audio mixer 545, one audio panning control 560 and one level meter control 570.

Figure 6:
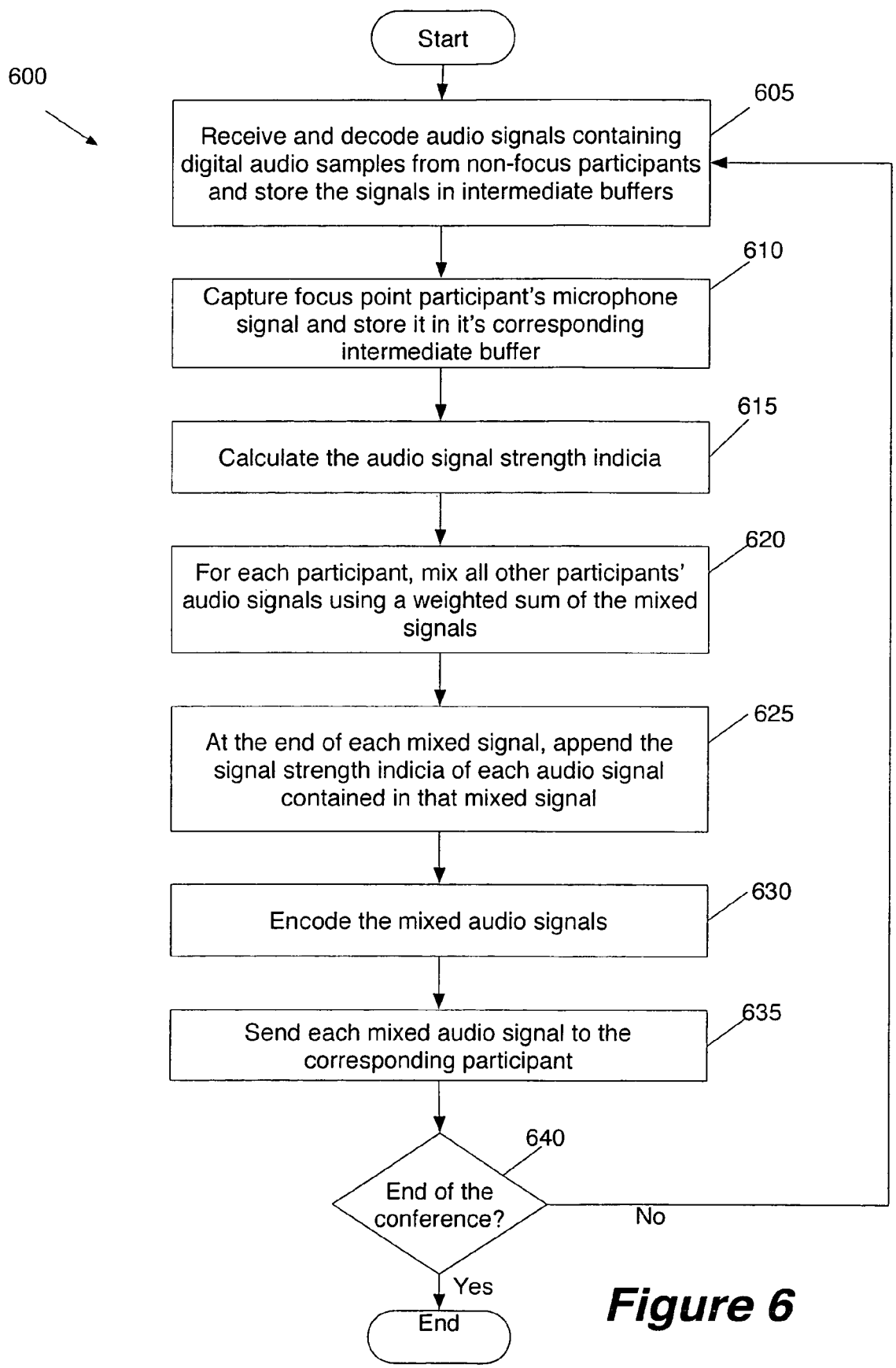
FIG. 6 is a flow chart showing mixed audio generation by the focus point in some of the embodiments.

The audio mixing operation of the focus point module 410 will now be described by reference to the mixing process 600 that conceptually illustrates the flow of operation in FIG. 6. The audio presentation operation of the focus point module is described in Section III below, along with the non-focus point module's audio presentation.

During the audio mixing process 600, two or more decoders 525 receive (at 605) two or more audio signals 510 containing digital audio samples from two or more non-focus point modules. In some embodiments, the received audio signals are encoded by the same or different audio codecs at the non-focus computers. Examples of such codecs include Qualcomm PureVoice, GSM, G.711, and ILBC audio codecs.

The decoders 525 decode and store (at 605) the decoded audio signals in two or more intermediate buffers 530. In some embodiments, the decoder 525 for each non-focus computer's audio stream uses a decoding algorithm that is appropriate for the audio codec used by the non-focus computer. This decoder is specified during the process that sets up the audio/video conference.

The focus point module 410 also captures audio from the participant that is using the focus point computer, through microphone 520 and the audio capture module 515. Accordingly, after 605, the focus point module (at 610) captures an audio signal from the focus-point participant and stores this captured audio signal in its corresponding intermediate buffer 532.

Next, at 615, the audio signal strength calculator 580 calculates signal strength indicia corresponding to the strength of each received signal. Audio signal strength calculator 580 assigns a weight to each signal. In some embodiments, the audio signal strength calculator 580 calculates the signal strength indicia as the Root Mean Square (RMS) power of the audio stream coming from the participant to the focus point. The RMS power is calculated from the following formula:

$$RMS = \sqrt{\frac{\sum_{i=1}^{N}(Sample_i)^2}{N}},$$

where N is the number of samples used to calculate the RMS power and $Sample_i$ is the $i^{th}$ sample's amplitude. The number of samples, N, that audio signal strength calculator 580 uses to calculate RMS value depends on the sampling rate of the signal. For example, in some embodiments of the invention where the sampling rate is 8 KHz, the RMS power might be calculated using a 20 ms chunk of audio data containing 160 samples. Other sampling rates may require a different number of samples.

Next, at 620, process 600 utilizes the audio mixers 535 and 545 to mix the buffered audio signals. Each audio mixer 535 and 545 generates mixed audio signals for one of the participants. The mixed audio signal for each particular participant includes all participants' audio signals except the particular participant's audio signal. Eliminating a particular participant's audio signal from the mix that the particular participant receives eliminates echo when the mixed audio is played on the participant computer's loudspeakers. The mixers 535 and 545 mix the audio signals by generating (at 620) a weighted sum of these signals. To obtain an audio sample value at a particular sample time in a mixed audio signal, all samples at the particular sampling time are added based on the weight values computed by the audio signal strength calculator 580. In some embodiments, the weights are dynamically determined based on signal strength indicia calculated at 615 to achieve certain objectives. Example of such objectives include (1) the elimination of weaker signals, which are typically attributable to noise, and (2) the prevention of one participant's audio signal from overpowering other participants' signals, which often results when one participant consistently speaks louder than the other or has better audio equipment than the other.

Figure 7:
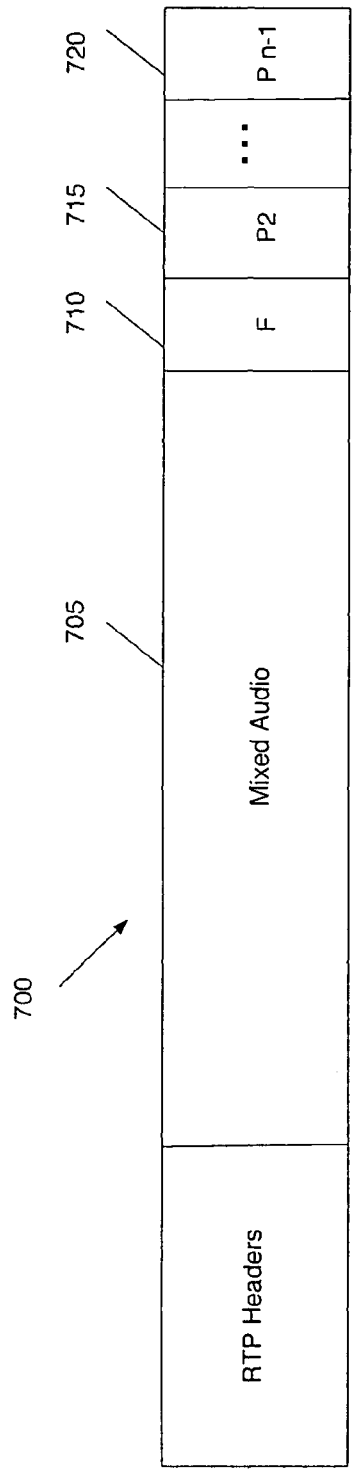
FIG. 7 illustrates how the RTP protocol is used by the focus point module in some embodiments to transmit audio content.

In some embodiments, the mixers 535 and 545 append (at 625) the signal strength indicia of all audio signals that were summed up to generate the mixed signal. For instance, FIG. 7 illustrates an RTP (Real-time Transport Protocol) audio packet 700 that some embodiments use to send a mixed audio signal 705 to a particular participant. As shown in this figure, signal strength indicia 710-720 are attached to the end of the RTP packet 705.

Next, for the non-focus computers' audio, the encoders 550 (at 630) encode the mixed audio signals and send them (at 635) to their corresponding non-focus modules. The mixed audio signal for the focus point computer is sent (at 635) unencoded to focus point audio panning control 560. Also, at 635, the signal strength indicia is sent to the level meter 570 of the focus point module, which then generates the appropriate volume level indicators for display on the display device 575 of the focus point computer.

After 635, the audio mixing process 600 determines (at 640) whether the multi-participant audio/video conference has terminated. If so, the process 600 terminates. Otherwise, the process returns to 605 to receive and decode incoming audio signals.

One of ordinary skill will realize that other embodiments might implement the focus point module 410 differently. For instance, in some embodiments, the focus point 410 produces a single mixed signal that includes every participant's audio. This stream along with signal strength indicia is sent to every participant. When playing this stream, a participant will mute playback if that same participant is the primary contributor. This scheme saves focus point computing time and provides echo suppression without requiring separate, distinct streams for each participant. Also, during IP multicast, the focus point stream bandwidth can be reduced. In these embodiments, the focus point 410 has one audio mixer 535 and one encoder 550.

III. The Non-Focus Point Module

Figure 8:
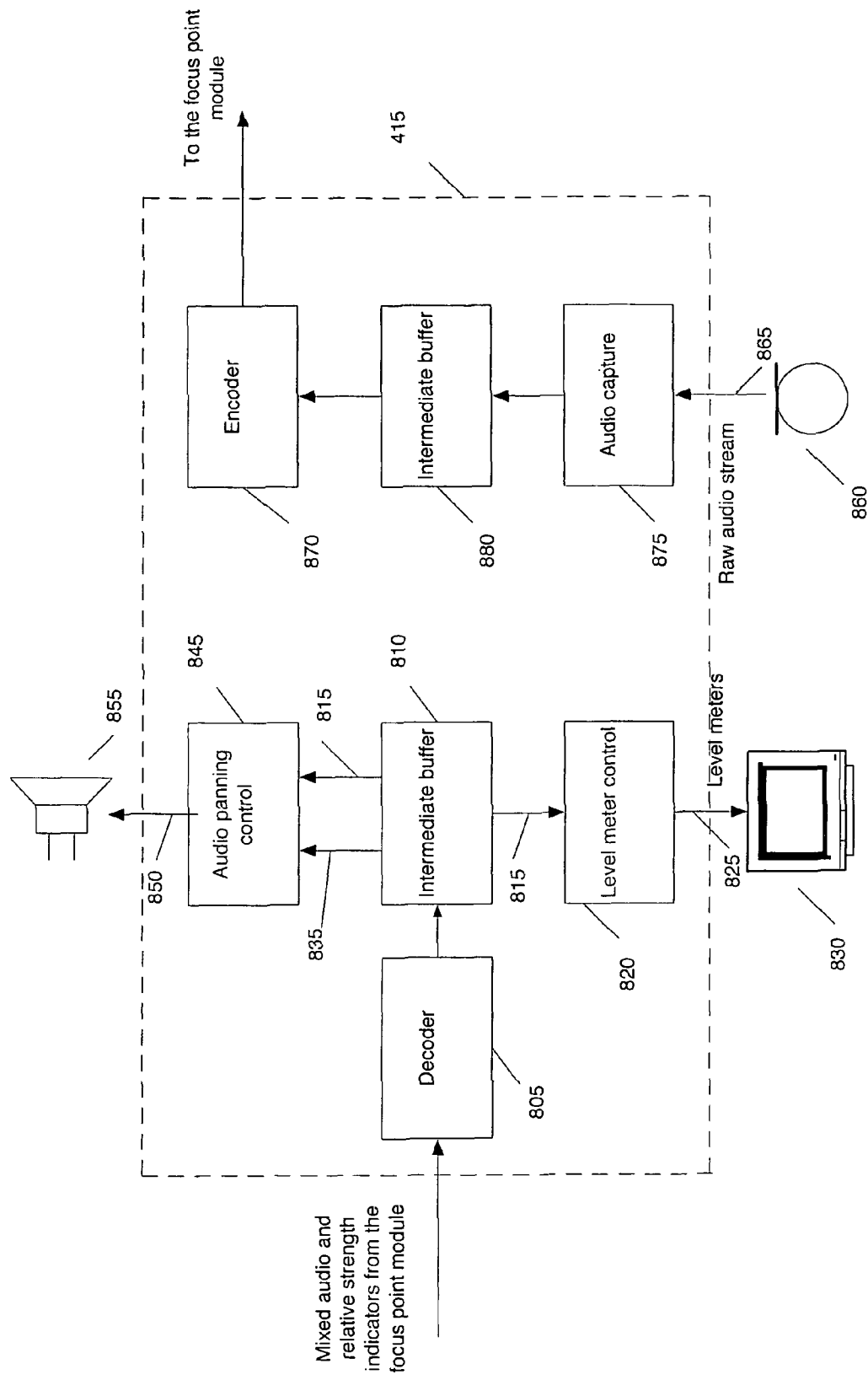
FIG. 8 illustrates the non-focus point of some embodiments of the invention.

FIG. 8 illustrates a non-focus point module 415 of an audio/video conference of some embodiments of the invention. In this example, the non-focus point module 415 utilizes a decoder 805, two intermediate buffers 810 and 880, a level meter control 820, an audio panning control 845, an audio capture module 875, and an encoder 870.

The non-focus point module performs encoding and decoding operations. During the encoding operation, the audio signal of the non-focus point participant's microphone 860 is captured by audio capture module 875 and is stored in its corresponding intermediate buffer 880. The encoder 870 then encodes the contents of the intermediate buffer 880 and sends it to the focus point module 410.

Figure 9:
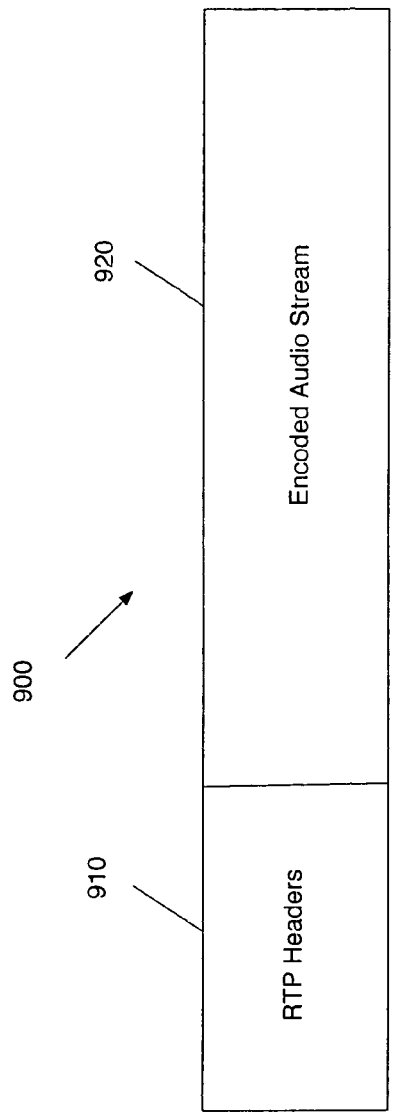
FIG. 9 illustrates how the RTP protocol is used by the non-focus point module in some embodiments to transmit audio content FIG. 10 conceptually illustrates the flow of non-focus point decoding operation in some embodiments.

In some embodiments that use Real-time Transport Protocol (RTP) to exchange audio signals, the non-focus participant's encoded audio signal is sent to the focus point module in a packet 900 that includes RTP headers 910 plus encoded audio 920, as shown in FIG. 9.

Figure 10:
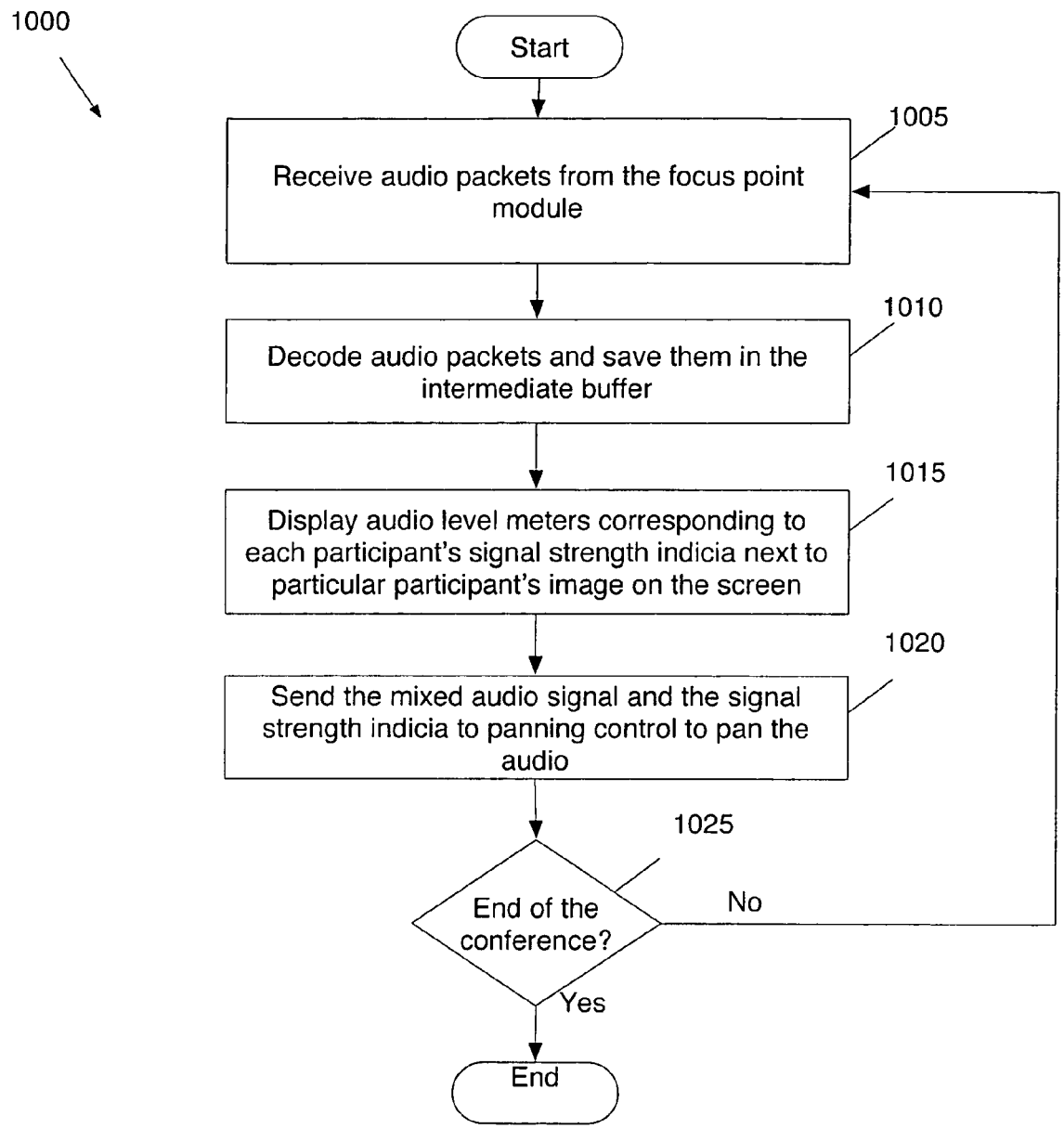

The decoding operation of the non-focus point module 415 will now be described by reference to the process 1000 that conceptually illustrates the flow of operation in FIG. 10. During the decoding operation, the decoder 805 receives (at 1005) audio packets from the focus point module 410. The decoder 805 decodes (at 1010) each received audio packet to obtain mixed audio data and the signal strength indicia associated with the audio data. The decoder 805 saves (at 1010) the results in the intermediate buffer 810.

The signal strength indicia are sent to level meter control 820 to display (at 1015) the audio level meters on the non-focus participant's display 830. In a multi-participant audio/video conference, it is desirable to identify active speakers. One novel feature of the current invention is to represent the audio strengths by displaying audio level meters corresponding to each speaker's voice strength. Level meters displayed on each participant's screen express the volume level of the different participants while the mixed audio signal is being heard from the loud speakers 855. Each participant's volume level can be represented by a separate level meter, thereby, allowing the viewer to know the active speakers and the audio level from each participant at any time.

Figure 11:
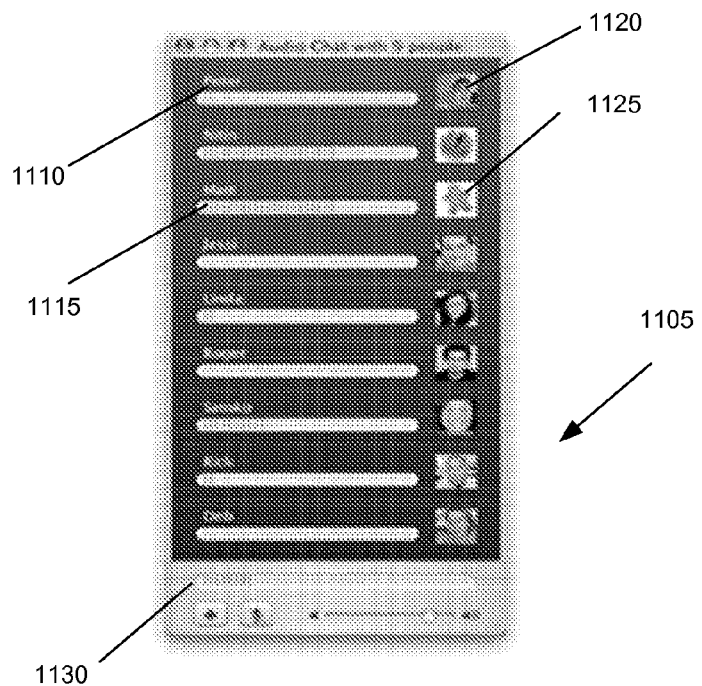
FIG. 11 illustrates the audio level meters displayed on some embodiments of the invention.

The level meters are particularly useful when some participants only receive audio signals during the conference (i.e., some participants are "audio only participants"). Such participants do not have video images to help provide a visual indication of the participants that are speaking. FIG. 11 illustrates an example of the use of level meters in an audio only conference of some embodiments. In this figure, each participant's audio level 1110-1115 is placed next to that participant's icon 1120-1125. As illustrated in FIG. 11, some embodiments display the local microphone's voice level 1130 separately at the bottom of the screen. One of ordinary skill in the art should realize that FIG. 11 is just one example of the way to show the level meters on a participant's display. Other display arrangements can be made without deviating from the teachings of this invention for calculating and displaying the relative strength of audio signals in a conference.

After 1015, the decoded mixed audio signal and signal strength indicia stored in the intermediate buffer 810 are sent (at 1020) to the audio panning control 845 to control the non-focus participant's loudspeakers 855. The audio panning operation will be further described below by reference to FIGS. 12 and 13.

After 1020, the audio decoding process 1000 determines (at 1025) whether the multi-participant audio/video conference has terminated. If so, the process 1000 terminates. Otherwise, the process returns to 1005 to receive and decode incoming audio signals.

Figure 12:
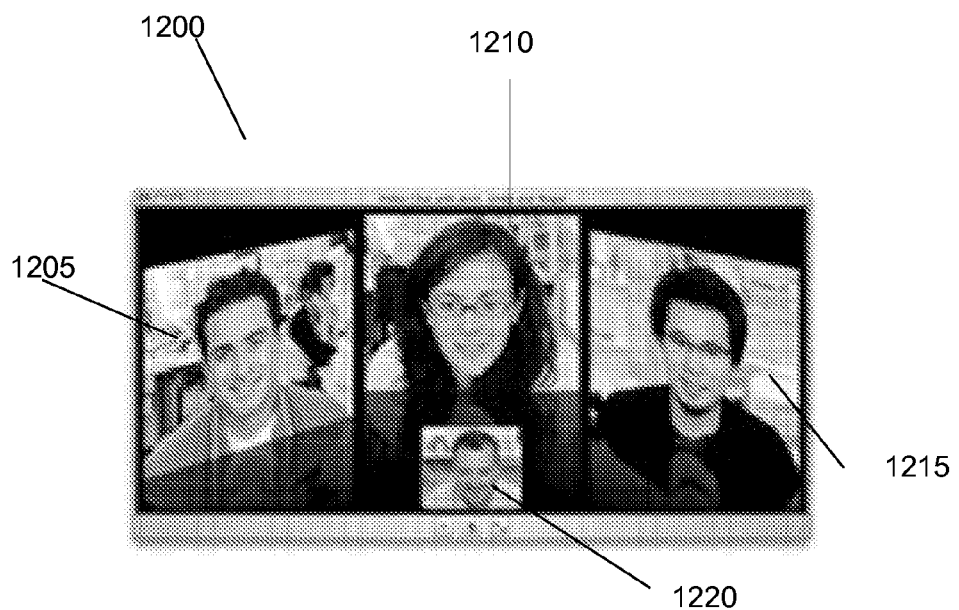
FIG. 12 shows an exemplary arrangement of participants' images on one of the participants' display.

The use of audio panning to make the perceived audio location match the video location is another novel feature of the current invention. In order to illustrate how audio panning is performed, FIG. 12 illustrates an example of a video-conference display presentation 1200 in the case of four participants in a video conference. As shown in FIG. 12, the other three participants' images 1205-1215 are displayed horizontally in the display presentation 1200. The local participant's own image 1220 is optionally displayed with a smaller size relative to the other participants' images 1205-1215 at the bottom of the display presentation 1200.

Some embodiments achieve audio panning through a combination of signal delay and signal amplitude adjustment. For instance, when the participant whose image 1205 is placed on the left side of the screen speaks, the audio coming from the right speaker is changed by a combination of introducing a delay and adjusting the amplitude to make the feeling that the voice is coming from the left speaker.

Figure 13:
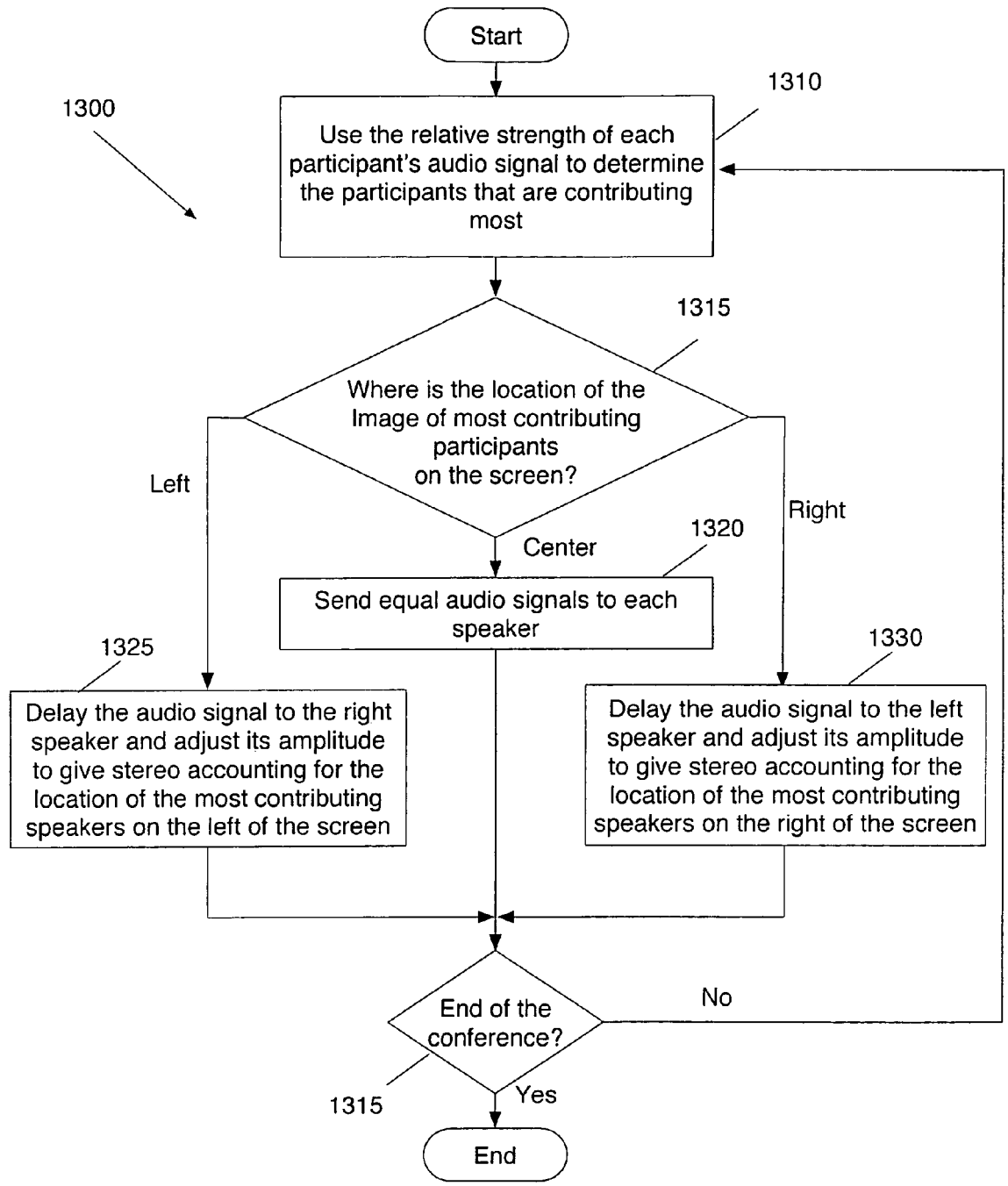
FIG. 13 is a flow chart illustrating the process by which some embodiments of the invention perform audio panning.

FIG. 13 illustrates a process 1300 by which the audio panning control of the non-focus module 845 operate in some embodiments of the invention. The signal strength indicia of each audio signal in the mixed audio signal is used (at 1310) to identify the most-contributing participant in the decoded mixed audio signal. Next, the process identifies (at 1315) the location of the participant or participants identified at 1310. The process then uses (at 1320-1330) a combination of amplitude adjustment and signal delay to create the stereo effect. For example, if the participant whose image 1205 is displayed on the left side of the displaying device 1200 is currently speaking, a delay is introduced (at 1325) on the right loudspeaker and the amplitude of the right loudspeaker is optionally reduced to make the signal from the left loudspeaker appear to be stronger.

Similarly, if the participant whose image 1215 is displayed on the right side of the displaying device 1200 is currently speaking, a delay is introduced (at 1330) on the left loudspeaker and the amplitude of the left loudspeaker is optionally reduced to make the signal from the right loudspeaker appear to be stronger. In contrast, if the participant whose image 1210 is displayed on the center of the displaying device 1200 is currently speaking, no adjustments are done to the signals sent to the loudspeakers.

Audio panning helps identify the location of the currently speaking participants on the screen and produces stereo accounting for location. In some embodiments of the invention, a delay of about 1 millisecond (1/1000 second) is introduced and the amplitude is reduced by 5 to 10 percent during the audio panning operation. One of ordinary skill in the art, however, will realize that other combinations of amplitude adjustments and delays might be used to create a similar effect.

In some embodiments, certain participant actions such as joining conference, leaving conference, etc. can trigger user interface sound effects on other participants' computers. These sound effects may also be panned to indicate which participant performed the associated action.

In the embodiments where the focus point is also a conference participant (such as the embodiment illustrated in FIG. 1), the focus point module also uses the above-described methods to present the audio for the participant whose computer serves as the conference focus point.

While the invention has been described with reference to numerous specific details, one of ordinary skill in the art will recognize that the invention can be embodied in other specific forms without departing from the spirit of the invention. In other places, various changes may be made, and equivalents may be substituted for elements described without departing from the true scope of the present invention. Thus, one of ordinary skill in the art would understand that the invention is not limited by the foregoing illustrative details, but rather is to be defined by the appended claims.

What claimed is:

1. A method of distributing audio content in a multi-participant audio/video conference, the method comprising:
   at a device of a first participant of said conference:
   receiving audio signals from at least second and third participants of said conference;
   determining a strength of each received audio signal;

generating indicia representative of said strengths for the received audio signals;
generating at least first and second mixed audio signals from the received audio signals, said first mixed audio signal different from said second mixed audio signal;
to each particular mixed audio signal, appending a set of generated strength indicia of the audio signals that are mixed to produce the particular mixed audio signal;
transmitting said first mixed audio signal to said second participant; and
transmitting said second mixed audio signal to said third participant.

2. The method of claim 1, wherein determining said strength comprises calculating the strength of each received audio signal as a root mean square (RMS) power of said received audio signal.

3. The method of claim 1, wherein the received audio signals are in real time protocol (RTP) packets.

4. The method of claim 1 further comprising locally outputting the mixed audio signals at the device of the first participant.

5. The method of claim 1 further comprising using the determined strength of a particular received audio signal to eliminate noise by not including the particular received audio signal in the mixed audio signal when said audio signal is weaker than other participants' audio signals.

6. The method of claim 1, wherein the determined strength of each audio signal is used to assign a weight to each audio signal, wherein the assigned weights are used to prevent one participant's audio signal from overpowering other participants' audio signals.

7. The method of claim 1, wherein the conference is an audio-only conference.

8. The method of claim 1, wherein said generating comprises generating a third mixed audio signal that includes the audio signals of the second and third participants, and said method further comprises locally playing said third mixed audio signal on the device of the first participant of said conference.

9. A method of distributing audio content in a multi-participant audio/video conference the method comprising:
at a device of a first participant of said conference:
receiving audio signals from at least second and third participants of said conference;
generating at least first and second mixed audio signals from the received audio signals, said first mixed audio signal different from said second mixed audio signal;
transmitting said first mixed audio signal to said second participant; and
transmitting said second mixed audio signal to said third participant,
wherein generating said mixed audio signals comprises removing the audio signal of the second participant from the first mixed audio signal and removing the audio signal of the third participant from the second mixed audio signal.

10. The method of claim 9 further comprising:
determining a strength of each received audio signal;
generating a set of indicia representative of said strengths for the received audio signals; and
appending said set of signal strength indicia to said mixed audio signals.

11. The method of claim 9, wherein the received audio signals are in real time protocol (RTP) packets.

12. A method of creating a stereo panning effect in a multi-participant audio/video conference, the method comprising:
displaying representations of at least two different participants in a display area, said displaying comprising displaying each of the representations in a distinct location in the display area;
receiving a mixed audio signal that comprises a set of indicia indicative of a signal strength for each of the different participants; and
panning the mixed audio signal across audio loudspeakers using said set of signal strength indicia in order to create an effect that a perceived location of an audio signal of a particular participant matches the location of the particular participant in the display area.

13. The method of claim 12, wherein said panning comprises:
identifying the location of the representation of the particular participant displayed in said display area, and
creating a delay on at least one of the audio loudspeakers to account for the identified location of the representation of the particular participant.

14. The method of claim 12, wherein at least one of the representations displayed in said display area is at least one of an icon, an image, and a video.

15. A method of creating a stereo panning effect in a multi-participant audio/video conference, the method comprising:
determining that a first participant in said conference performed a particular action;
identifying a location of a video presentation of the first participant on a display device of a second participant, said display device of the second participant further displaying a video presentation of at least a third participant at another location;
determining a sound effect for the particular action; and
based on said identified location, panning said sound effect across audio loudspeakers of the second participant to cause the second participant to perceive sound associated with said action to originate from the location of the video presentation of the first participant on the display device.

16. The method of claim 15, wherein said panning comprises creating a delay on at least one of the audio loudspeakers of the second participant to account for the identified location of the first participant.

17. The method of claim 15, wherein said action is one of joining and leaving the conference.

18. The method of claim 15, wherein said panning comprises using a signal strength indicia to account for the identified location of the first participant.

19. A computer readable medium storing a computer program for distributing audio content in a multi-participant audio/video conference, the computer program comprising sets of instructions for:
at a device of a first participant of said conference:
receiving audio signals from at least second and third participants of said conference;
determining a strength of each received audio signal;
generating indicia representative of said strengths for the received audio signals;
generating at least first and second mixed audio signals from the received audio signals, said first mixed audio signal different from said second mixed audio signal;
to each particular mixed audio signal, appending the set of generated strength indicia of the audio signals that are mixed to produce the particular mixed audio signal;
transmitting said first mixed audio signal to said second participant; and
transmitting said second mixed audio signal to said third participant.

20. The computer readable medium of claim 19, wherein said set of instructions for determining said strength comprises a set of instructions for calculating the strength of each received audio signal as a root mean square (RMS) power of said received audio signal.

21. The computer readable medium of claim 19, wherein said set of instructions for generating comprises a set of instructions for generating a third mixed audio signal that includes the audio signals of the second and third participants, and said program further comprises a set of instructions for locally playing said third mixed audio signal on the device of the first participant of said conference.

22. A computer readable medium storing a computer program for distributing audio content in a multi-participant audio/video conference, the computer program comprising sets of instructions for:
at a device of a first participant of said conference:
receiving audio signals from at least second and third participants of said conference;
generating at least first and second mixed audio signals from the received audio signals, said first mixed audio signal different from said second mixed audio signal;
transmitting said first mixed audio signal to said second participant; and
transmitting said second mixed audio signal to said third participant;
wherein the set of instructions for generating the mixed audio signals comprises a set of instructions for removing the audio signal of the second participant from the first mixed audio signal and removing the audio signal of the third participant from the second mixed audio signal.

23. The computer readable medium of claim 22, wherein said generating comprises generating a third mixed audio signal that includes the audio signals of the second and third participants, said computer program further comprising a set of instructions for locally playing said third mixed audio signal on the device of the first participant of said conference.

24. A computer readable medium storing a computer program for creating a stereo panning effect in a multi-participant audio/video conference, the computer program comprising sets of instructions for:
displaying representations of at least two different participants in a display area, said displaying comprising displaying each of the representations in a distinct location;
receiving a mixed audio signal that comprises a set of indicia indicative of a signal strength for each of the different participants; and
panning the mixed audio signal across audio loudspeakers using said set of signal strength indicia in order to create an effect that a perceived location of an audio signal of a particular participant matches the location of the particular participant in the display area.

25. The computer readable medium of claim 24, wherein said set of instructions for said panning comprises sets of instructions for:
identifying the location of one of the representations that is displayed in said display area, and
creating a delay on at least one of the audio loudspeakers to account for the identified location of the representation.

26. The computer readable medium of claim 24, wherein at least one of the representations displayed in said display area is at least one of an icon, an image, and a video.

27. A method of distributing audio content in a multi-participant audio/video conference the method comprising:
at a device of a first participant of said conference:
receiving audio signals from at least second and third participants of said conference;
generating at least first and second mixed audio signals from the received audio signals, said first mixed audio signal being different from said second mixed audio signal;
transmitting said first mixed audio signal to said second participant; and
transmitting said second mixed audio signal to said third participant,
wherein a plurality of the mixed audio signals are transmitted using real time protocol (RTP) packets comprising an indicia of strength of each audio signal in the mixed audio signal.

28. The method of claim 27 further comprising:
determining a strength of each received audio signal;
generating a set of indicia representative of said strengths for the received audio signals; and
appending said set of signal strength indicia to said mixed audio signals.

29. The method of claim 28, wherein the determined strength of each audio signal is used to assign a weight to each audio signal, wherein the assigned weights are used to prevent one participant's audio signal from overpowering other participants' audio signals.

30. For an audio/video conference comprising a plurality of participants, a method comprising:
providing a graphical user interface (GUI) comprising a display area for displaying graphical representations of each of the plurality of participants in a particular location; and
providing a controller for (i) receiving a mixed audio signal comprising audio signals corresponding to each participant of the plurality of participants, (ii) specifying at least one playback parameter for playing back the mixed audio signal in order to create a panning effect that a perceived location of an audio signal of a particular participant matches the particular location of the particular participant in the display area, and (iii) receiving a set of signal strength indicia.

31. The method of claim 30, wherein a first participant has a set of stereo loudspeakers, wherein the creating the panning effect comprises playing the audio signal such that said audio signal is perceived as originating from a loudspeaker that is closer to the particular location of the particular participant in the display area than a loudspeaker that is farther from said particular location.

32. The method of claim 30, wherein a first participant has a set of stereo loudspeakers, wherein a first loudspeaker is closer to the particular location of the particular participant in the display area than a second loudspeaker, wherein the specified playback parameter causes the mixed audio signal to be played through the first loudspeaker before the second loudspeaker when the particular participant speaks.

33. The method of claim 30, wherein a first participant has a set of stereo loudspeakers, wherein the controller is further for using said particular location as a factor to define a difference in playback parameters of the mixed audio signal through each loudspeaker.

34. The method of claim 30, wherein a first participant has a set of stereo loudspeakers, wherein the specified playback parameter causes the audio signal to be played through one of said loudspeakers with an altered amplitude.

35. The method of claim 30, wherein the graphical representation of a particular participant is one of a picture, a video, and an icon of the particular participant.

36. The method of claim 30, wherein the audio signal comprises a sound associated with an action event that is one of joining and leaving the conference.

37. The method of claim 30, wherein the controller is further for determining that the particular participant is a most active participant by comparing signal strengths of the audio signals of each participant and determining that the particular participant has the strongest audio signal.

38. For an audio conference having a plurality of participants, a method comprising:
providing an audio capture module for capturing a first audio signal of a first participant speaking during said conference;
providing an audio signal strength calculator for calculating a signal strength of the received audio signals; and
providing an audio mixer for (i) receiving the first audio signal and at least a second audio signal of a second participant, (ii) generating a mixed audio signal for the second participant, said generating comprising removing the audio signal of the second participant from said mixed audio signal, and (iii) transmitting said mixed audio signal to said second participant with data regarding said calculated audio signal strength, wherein said audio capture module and said audio mixer are provided as parts of one audio conference application.

39. The method of claim 38 further comprising providing a focus point module comprising:
a set of decoders for receiving the audio signals;
said audio mixer; and
said audio capture module.

40. The method of claim 38 further comprising providing a set of buffers for storing the audio signals received from the participants of said conference.

41. For an audio conference having a plurality of participants, a method comprising:
providing an audio capture module for capturing a first audio signal of a first participant speaking during said conference;
providing an audio mixer for (i) receiving the first audio signal and at least a second audio signal of a second participant, (ii) generating a mixed audio signal for the second participant, said generating comprising removing the audio signal of the second participant from said mixed audio signal, and (iii) transmitting said mixed audio signal to said second participant, wherein said audio capture module and said audio mixer are provided as parts of one audio conference application; and
providing a display area for displaying signal strengths of the received audio signals.

42. The method of claim 41 further comprising providing a set of buffers for storing the audio signals received from the participants of said conference.

43. The method of claim 41 further comprising providing an audio signal strength calculator for calculating signal strength of the received audio signals.

44. For an audio conference having a plurality of participants, a method comprising:
providing an audio capture module for capturing a first audio signal of a first participant speaking during said conference; and
providing an audio mixer for (i) receiving the first audio signal and at least a second audio signal of a second participant, (ii) generating a mixed audio signal for the second participant, said generating comprising removing the audio signal of the second participant from said mixed audio signal, and (iii) transmitting said mixed audio signal to said second participant, wherein said audio capture module and said audio mixer are provided as parts of one audio conference application,
wherein the mixed audio signal comprises indicia that express signal strengths of the received audio signals.

45. The method of claim 44 further comprising providing an encoder for (i) encoding the mixed audio signal and (ii) outputting said encoded mixed audio signal to at least one particular participant.

46. The method of claim 45, wherein said mixed audio signal does not include an audio signal corresponding to the particular participant.

47. For a multi-participant audio/video conference, a method comprising:
providing a multi-participant audio/video conference application, wherein said providing said multi-participant audio/video conference application comprises:
providing an audio capture module for locally capturing an audio signal of a first participant speaking during said multi-participant audio/video conference; and
providing an audio mixer for (i) receiving at least one other audio signal from at least a second participant of said conference, (ii) generating a mixed audio signal from the audio signals of the first and second participants, and (iii) transmitting said mixed audio signal to a third participant of said conference.

48. The method of claim 47, wherein providing the multi-participant audio/video conference application further comprises providing a graphical user interface that comprises a display area for displaying representations of at least the second and third participants of said conference.

49. The method of claim 48 further comprising providing a focus point module, wherein said focus point module is for determining a set of indicia representative of signal strengths of the received audio signals, wherein providing the multi-participant audio/video conference application further comprises providing a level meter module for displaying level meters in said display area based on the set of signal strength indicia.

50. The method of claim 48, wherein providing the multi-participant audio/video conference application further comprises providing a panning module for panning the received mixed audio signals across loudspeakers in accord with locations of the representations displayed in said display area.

51. A method of distributing audio content in a multi-participant audio/video conference, said method comprising:
receiving audio signals from at least first and second participants of said conference;
for the first participant, generating a mixed audio signal from the received audio signals, said generating comprising removing the audio signal of the first participant from said mixed audio signal; and
transmitting said mixed audio signal to said first participant of said conference,
wherein said receiving, generating, and transmitting are operations performed on a device of a participant of said conference other than the first participant, said operations performed by an audio/video conference application executing on said device.

52. The method of claim 51 further comprising:
determining a strength of each received audio signal;
generating a set of indicia representative of said strengths for the received audio signals; and
appending said set of signal strength indicia to said mixed audio signals.

53. The method of claim 51, wherein the received audio signals are in real time protocol (RTP) packets.

* * * * *

UNITED STATES PATENT AND TRADEMARK OFFICE
CERTIFICATE OF CORRECTION

| | | |
|---|---|---|
| PATENT NO. | : 7,864,209 B2 | Page 1 of 1 |
| APPLICATION NO. | : 11/118555 | |
| DATED | : January 4, 2011 | |
| INVENTOR(S) | : Hyeonkuk Jeong et al. | |

It is certified that error appears in the above-identified patent and that said Letters Patent is hereby corrected as shown below:

In column 9, line 39, in claim 9, delete "conference" and insert -- conference, --, therefor.

In column 11, line 60, in claim 27, delete "conference" and insert -- conference, --, therefor.

Signed and Sealed this
Twenty-fifth Day of October, 2011

David J. Kappos
*Director of the United States Patent and Trademark Office*